United States Patent [19]
Harigai et al.

[11] Patent Number: 5,454,116
[45] Date of Patent: Sep. 26, 1995

[54] SEMICONDUCTOR INTEGRATED CIRCUIT WITH EXTERNAL CLOCK SIGNAL AND REDUCED DATA OUTPUT DELAY

[75] Inventors: Hisao Harigai; Hiroaki Suzuki, both of Tokyo, Japan

[73] Assignee: NEC Corporation, Japan

[21] Appl. No.: 19,078

[22] Filed: Feb. 18, 1993

[30] Foreign Application Priority Data

Feb. 19, 1992 [JP] Japan ............................ 4-31228

[51] Int. Cl.$^6$ .................. G06F 1/00; G06F 1/04; G06F 1/06
[52] U.S. Cl. ............ 395/800; 395/550; 326/96; 364/270; 364/270.3; 364/DIG. 1:927.8; 364/DIG. 2
[58] Field of Search .............. 395/325, 550, 395/800; 326/93, 96

[56] References Cited

U.S. PATENT DOCUMENTS

| | | | |
|---|---|---|---|
| 3,898,480 | 8/1975 | Spence et al. | 326/96 |
| 4,103,182 | 7/1978 | Bradley | 326/113 |
| 4,761,567 | 8/1988 | Walters et al. | 327/295 |
| 5,155,391 | 10/1992 | Wendell | 326/96 |
| 5,291,070 | 3/1994 | Witt | 327/141 |
| 5,305,453 | 4/1994 | Boudry et al. | 395/550 |

Primary Examiner—Thomas C. Lee
Assistant Examiner—Dinh: D.

[57] ABSTRACT

A semiconductor integrated circuit has a clock input buffer, a set of clock drivers, an input buffer, an input latch, an output latch, and a three-state buffer. The clock input buffer produces a first intermediate clock signal in phase with an external clock signal and a second intermediate clock signal out of phase with the external clock signal. With the first intermediate clock signal applied, the set of clock drivers produce non-overlapping two internal clock signals, namely, a first internal clock signal in phase with the external clock signal and a second internal clock signal out of phase with the external clock signal. The input latch is controlled by either the first internal clock signal or the second internal clock signal and latches an output of the input buffer connected to an input/output terminal. The output latch is controlled by the second intermediate clock signal and the latch control signal and latches a signal to be outputted. The three-state buffer outputs an output of the output latch to the input/output terminal. It is possible to reduce, with respect to the external clock signal, the delay time of the data output from the data input/output terminal and also to reduce, for the multi-bit data input/output terminals which operate simultaneously, the output delay time and its variations.

3 Claims, 6 Drawing Sheets

SEMICONDUCTOR INTEGRATED CIRCUIT WITH EXTERNAL CLOCK SIGNAL AND REDUCED DATA OUTPUT DELAY

BACKGROUND OF THE INVENTION (1) Field of the Invention

The present invention relates to a semiconductor integrated circuit, and more particularly to a semiconductor integrated circuit such as that for use for a microprocessor or a memory device in which the operational timing is determined by a clock signal inputted externally thereof.

(2) Description of the Related Art

In this explanation, a microprocessor is taken as an example of a conventional semiconductor circuit. In recent years, the operational frequencies of internal clocks in microprocessors have dramatically increased and there are many examples in which such operational frequencies are in the order of 25 MHz. When considering further advancement in internal processing capability of the microprocessor, there is a barrier or neck in the capability with which the microprocessor will have access to and communicate data with a data source such as an external memory through an address bus or data bus. This barrier is called a "bus neck". Thus, in microprocessors having a high internal processing capability, a bus cycle with a minimum of two clocks for a cycle is often employed in order to reduce the problem of "bus neck" and for purposes of enhancing the efficiency in use of buses by reducing the time required for bus cycles.

On the other hand, with the reduction in the time required for one bus cycle, it becomes important to limit to small extent the delay time of an output signal such as an address signal or a bus cycle control signal of the microprocessor from a clock. For example, if a microprocessor having an internal clock frequency of 25 MHz executes one bus cycle within two clocks, the time required by the one bus cycle is only 80 nsec.

FIG. 1 is block diagram showing a conventional microprocessor. The microprocessor shown in FIG. 1 has an internal clock generating block 10 which includes a clock input buffer 12, a first clock driver 13, and a second clock driver 14. The clock input buffer 12 receives an external clock signal CLK from a clock input pad 11 and shapes its waveform. The first clock driver 13 receives an output from the clock input buffer 12 and generates a first internal clock $CLK_1$ and a second internal clock $CLK_2$ which are non-overlapping clocks. The clock driver 14 is identical in circuit construction to the clock driver 13. The clock driver 14 and the clock driver 13 are laid-out in a coupled pair and respectively generate the first internal clock $CLK_1$ and the second internal clock $CLK_2$ whose phases are non-overlapping. As shown in FIG. 1, the first internal clock $CLK_1$ and the second internal clock $CLK_2$ generated by the first clock input driver 13 and the second clock input driver 14 use in common a clock signal path for the first internal clock $CLK_1$ and a clock signal path for the second internal clock $CLK_2$, respectively.

An input/output control circuit 20 of the microprocessor produces a control signal OCS synchronous with the first internal clock $CLK_1$, a latch control signal LTC for an output latch synchronous with the first internal clock $CLK_1$, and an input mask signal IPM synchronous with the first internal clock $CLK_1$. The latch control signal LTC is a signal which, in synchronization with the first internal clock $CLK_1$ at the start of a data output bus cycle, becomes active (high) by one clock once for one data output bus cycle. The control signal OCS is a signal which, in synchronization with the first internal clock $CLK_1$ before the start of the data output bus cycle, becomes active (high) once for one data output bus cycle and remains active until the timing of the first internal clock $CLK_1$ at which the bus cycle is completed. A latch 21 receives the control signal OCS with the second internal clock $CLK_2$ being applied as a latch signal and produces an output control signal OPC synchronous with the second internal clock $CLK_2$. The input mask signal IPM becomes active (high) in synchronization with the first internal clock $CLK_1$ when no data is inputted to the microprocessor.

The numeral 30 denotes a data input/output block for 1 bit in the microprocessor. The numeral 31 denotes a pad of a data input/output terminal. An input buffer 32 receives data inputted to the data input/output terminal pad 31 and an input latch 33 receives an output from the input buffer 32 with the second internal clock $CLK_2$ being applied as a latch signal. The data latched by the input latch 33 at the timing of the second internal clock $CLK_2$ is transferred to an input data register 40 via an internal signal path 41. At an output data register 50, the data outputted externally from the microprocessor is held at the timing synchronous with the first internal clock $CLK_1$ and is inputted through an internal signal path 51 to an output latch 34 the output latch 34 receives the contents of the output data register 50 which have been transferred through the internal signal path 51, and is latch-controlled by the output latch control signal LTC with the second internal clock $CLK_2$ being applied as a mask clock. An output three-state buffer 35 receives an output from the output latch 34 and outputs an output to the data input/output terminal pad 31 and is controlled for its output of an active state or an inactive state (high impedance state) by the output control signal OPC.

FIG. 2 is a timing chart for explaining the operation of the above conventional microprocessor. In FIG. 2, it is now assumed that two clocks of the microprocessor between the timing $T_{60}$ and the timing $T_{65}$ constitute a data output bus cycle. The timing specification values of the microprocessor are determined following those of external clock signal CLK. For example, a data output delay time is set as the time period from the rise of the external clock signal CLK (timing $T_{61}$) to the settling of the data (timing $T_{64}$). This data output delay time is thus the time period from the timing (timing $T_{63}$) at which the output control signal OPC becomes active to the timing at which the output three-state buffer 35 completes the driving of the external load capacitance.

In the data output delay time from the timing of $T_{61}$ to the timing of $T_{64}$ in the conventional technique, there is included a delay time from the falling of the external clock signal CLK to the rising of the second internal clock $CLK_2$, that is, the internal delay time (timing $T_{61}$ to timing $T_{62}$) of the internal clock generating block 10.

Generally, in a microprocessor constituted by CMOS transistors, the internal delay time of the internal clock generating block 10 is in the order of 5–10 nsec. As the operational frequency of the microprocessor becomes higher, there is a decrease in the bus cycle time as is noted above so that it is necessary to make the data output delay time shorter accordingly. If the microprocessor is of 25 MHz with 2 clock bus cycle, the internal delay time of 5–10 nsec is large and not negligible in the internal clock generating block 10 for 1 bus cycle of 80 nsec. Furthermore, if the operating temperature of the chip rises along with an upward change of the operational frequency of the microprocessor, there will be a further increase in the delay time due to an increase in an internal delay time of the internal clock generating block 10. This is a problem to be solved by the present invention, in the conventional semiconductor integrated circuit such as a microprocessor.

SUMMARY OF THE INVENTION

It is, therefore, and object of the present invention to overcome the problems existing in the conventional arrangement and to provide an improved semiconductor integrated circuit such as that for use in a microprocessor or a memory device.

According to one aspect of the invention, there is provided a semiconductor integrated circuit comprising:

a clock input buffer which receives an external clock signal applied to an external clock input terminal pad and generates a first intermediate clock signal of the same phase as that of the external clock signal and a second intermediate clock signal of a phase opposite to that of the external clock signal;

a set of clock drivers which, with the first intermediate clock signal being applied, generate non-overlapping two internal clock signals, one being a first internal clock signal of the same phase as that of the external clock signal and the other being a second internal clock signal of a phase opposite to that of the external clock signal;

an input/output control circuit which generates at least an output control signal and a latch control signal synchronous with the first internal clock signal;

an input buffer an input node of which is connected to an input/output terminal pad and which shapes waveforms of an input signal inputted through the input/output terminal pad;

an input latch which is controlled by either one of the first internal clock signal and the second internal clock signal and latches an output of the input buffer;

an output latch which is controlled by the second intermediate clock signal and the latch control signal and latches a signal to be outputted; and a three-state buffer which is controlled by the output control signal and outputs an output of the output latch to the input/output terminal pad.

The semiconductor integrated circuit according to the invention is characterized in that a data input/output block formed by the input buffer, the input latch, the output latch and the three-state buffer is positioned adjacent to the corresponding input/output terminal pad; and the plurality of data input/output blocks having the same circuit construction are used for the input/output terminal pads wherein the same function, the same timing and the same load capacitance are regulated.

Further, the semiconductor integrated circuit according to the invention is characterized in that the set of clock drivers are in a coupled pair, disposed respectively at a first and a second peripheral side opposing each other in a chip, receive respectively the first intermediate clock signal, and produce respectively the first internal clock signal and the second internal clock signal which are not overlapped with each other; the first internal clock signal and the second internal clock signal generated respectively by the two clock drivers use in common a signal path for the first internal clock signal and a signal path for the second internal clock signal, respectively; and a block integrally formed by the external clock input terminal pad and the clock input buffer is disposed at a third peripheral side different from the first and second peripheral sides in such a way that the lengths of wirings from the clock input buffer to the two clock drivers (13,14) are the same as each other.

BRIEF DESCRIPTION OF THE DRAWINGS

The above and other objects, features and advantages of the present invention will be apparent from the following description of a preferred embodiment of the invention explained with reference to the accompanying drawings, in which.

DESCRIPTION OF THE PREFERRED EMBODIMENTS

Now, a preferred embodiment of the invention is explained with reference to the accompanying drawings. It is to be noted that, throughout the following explanation, similar reference symbols or numerals refer to the same or similar elements in all the figures of the drawings.

Figure 1:
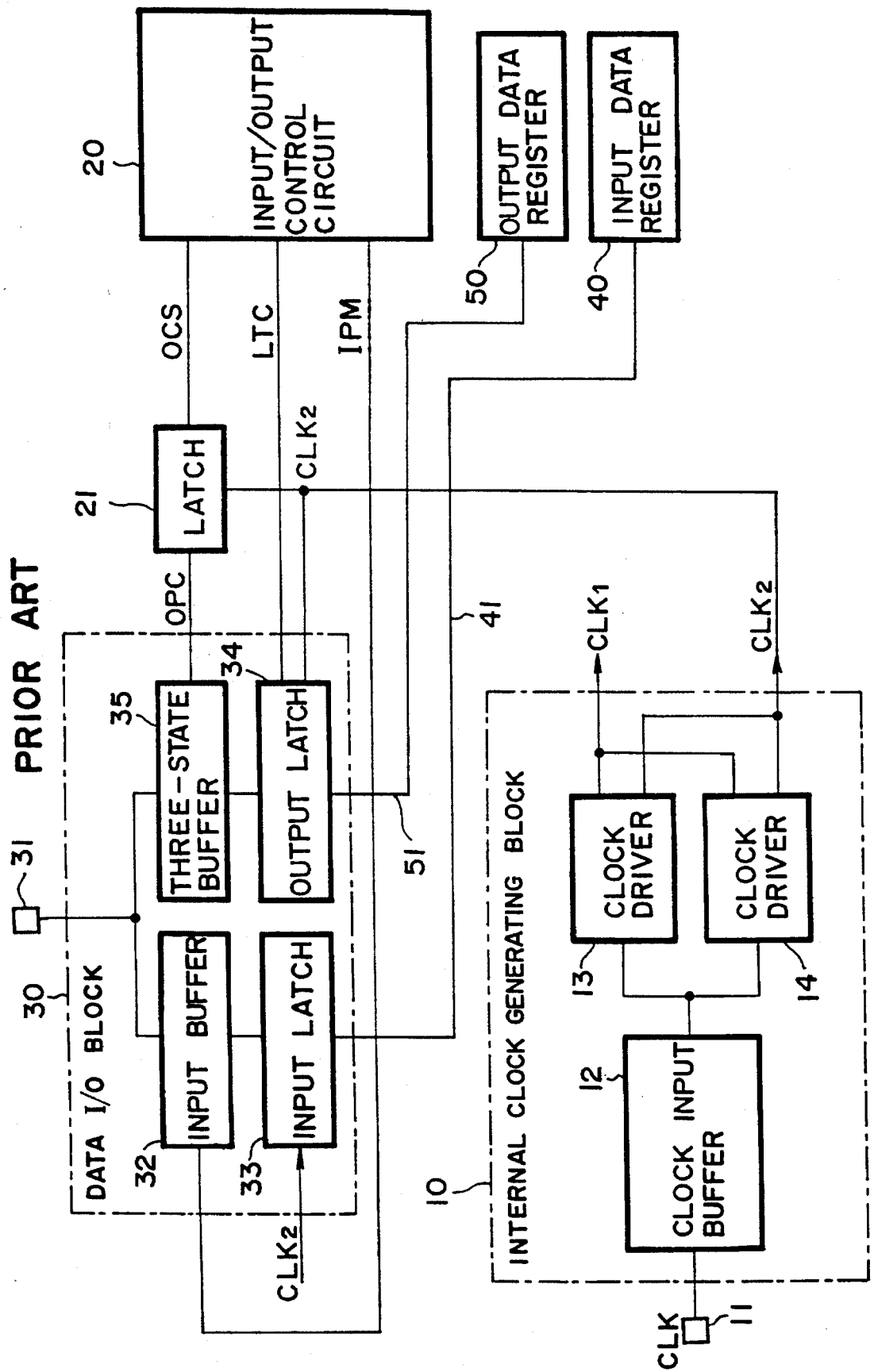
FIG. 1 is a block diagram showing a conventional microprocessor.
Figure 2:
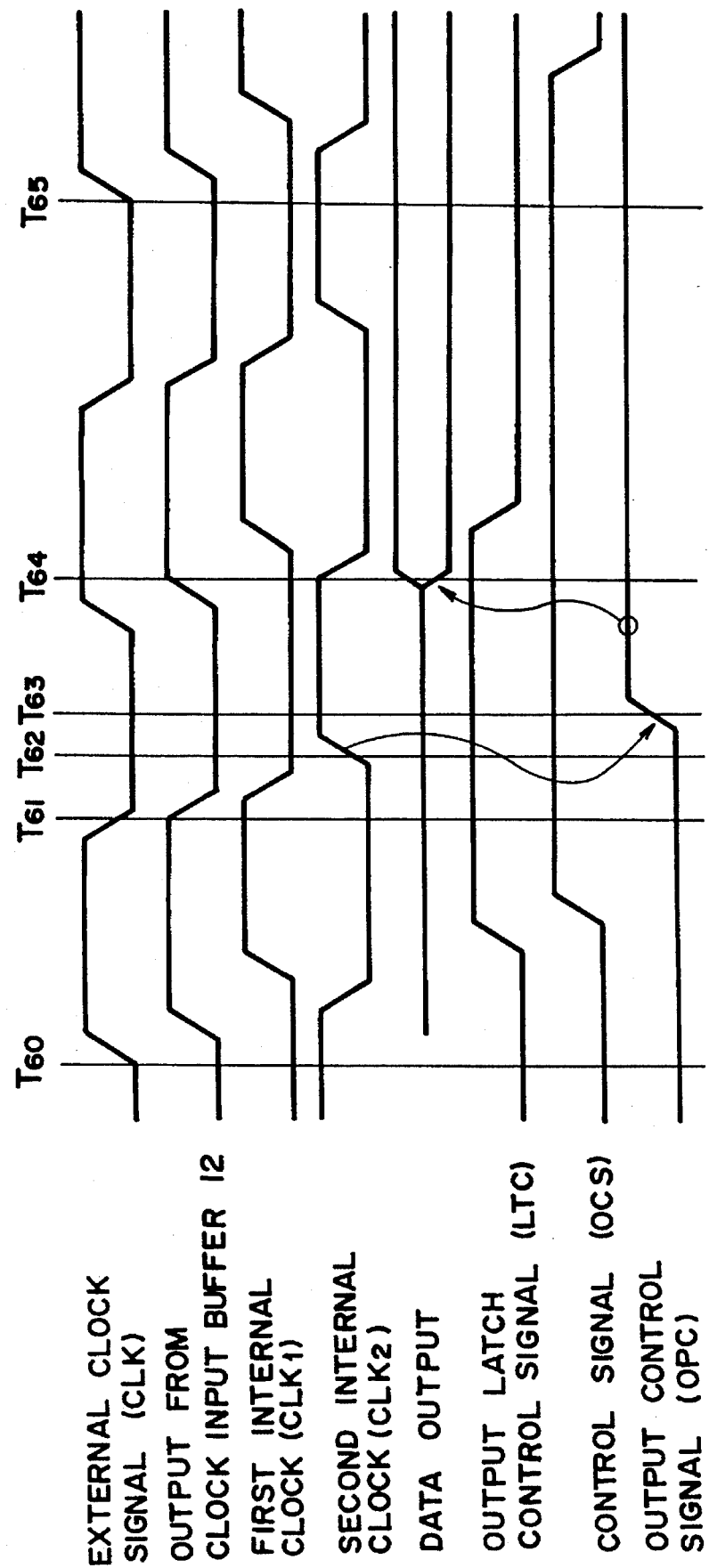
FIG. 2 is a timing chart for explaining the operation of the conventional microprocessor.
Figure 3:
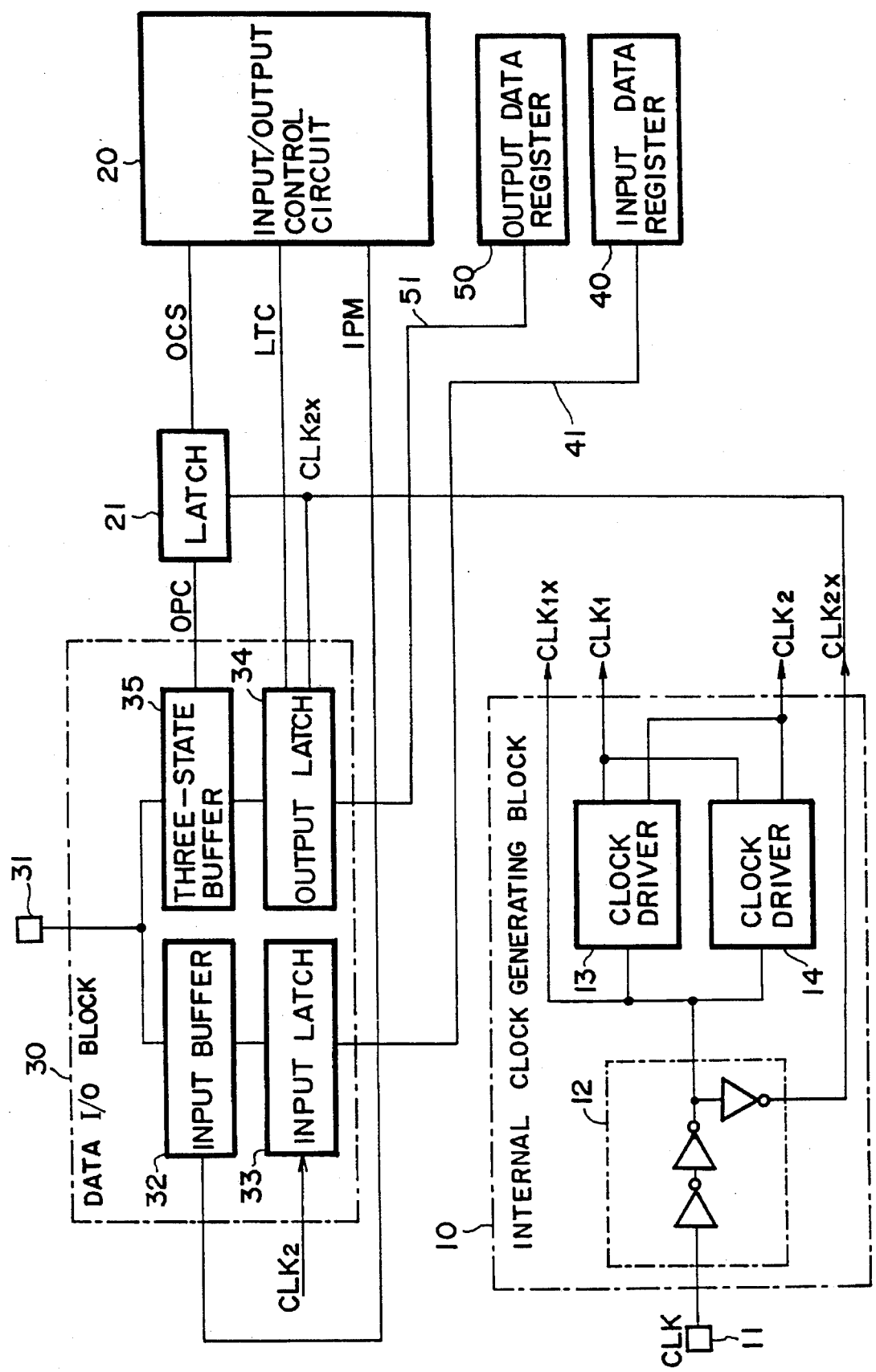
FIG. 3 is a block diagram showing an embodiment of a microprocessor according to the present invention.

FIG. 3 is a block diagram showing the embodiment of the invention. The numeral 10 shows an internal clock generating block 10 and the numeral 11 a clock input terminal pad 11. A clock input buffer 12 receives an external clock signal CLK inputted from the clock input terminal pad 11. The clock input buffer shapes the waveforms of the external clock signal and generates a first intermediate clock $CLK_{1X}$ and a second intermediate clock $CLK_{2X}$. The first intermediate $CLK_{1X}$ is in phase with the external clock signal CLK and the second intermediate clock $CLK_{2X}$ is in an opposite phase with respect to the external clock signal CLK. A first clock driver 13 receives the first intermediate clock $CLK_{1X}$ and generates the first internal clock $CLK_1$ and the second internal clock $CLK_2$ which are non-overlapped clocks. A second clock driver 14 is in the same circuit configuration as and in a paired layout with the first clock driver 13 and generates the first internal clock $CLK_1$ and the second internal clock $CLK_2$ which are non-overlapped clocks. As shown in FIG. 3, the first internal clock $CLK_1$ and the second internal clock $CLK_2$ generated by the first clock driver 13 and the second clock driver 14 use in common a clock signal path for the first internal clock $CLK_1$ and a clock signal path for the second internal clock $CLK_2$, respectively.

An input/output control circuit 20 in the microprocessor of this embodiment generates a control signal OCS synchronous with the first internal clock $CLK_1$, a latch control signal LTC for an output latch synchronous with the first internal clock $CLK_1$, and an input mask signal synchronous with the first internal clock $CLK_1$. The latch control signal LTC is in synchronization with the first internal clock $CLK_1$ at the start of a data output bus cycle, becomes active (high) by one clock once for one data output bus cycle. The control signal OCS is in synchronization with the first internal clock $CLK_1$ before the start of the data output bus cycle becomes active (high) once for one data output bus cycle and remains active until the timing of the first internal clock $CLK_1$ at which the bus cycle is completed. A latch 21 receives the control signal OCS with the second intermediate clock $CLK_{2X}$ being applied as a latch signal and generates an output control signal OPC synchronous with the second intermediate clock $CLK_{2X}$. The input mask signal IPM becomes active (high) in synchronization with the first internal clock $CLK_1$ when there is no data input to the microprocessor.

The numeral 30 denotes a data input/output block for 1 bit in the microprocessor of this embodiment. The numeral 31 denotes a data input/output terminal pad. An input buffer 32 receives data inputted to the data input/output terminal pad 31 and an input latch 33 receives an output for the input buffer 32 with the second internal clock $CLK_2$ being applied as a latch signal. The data latched by the input latch 33 at the timing of the second internal clock $CLK_2$ is transferred to an input data register 40 via an internal signal path 41. At an output data register 50, the data outputted externally from the microprocessor is held at the timing synchronous with the first internal clock $CLK_1$ and is inputted through an internal signal path 51 to an output latch 34. The output latch 34 receives the contents of the output data register 50 which have been transferred through the internal signal path 51, and is latch-controlled by the output latch control signal LTC with the second intermediate clock $CLK_{2X}$ being applied as a mask clock. An output three-state buffer 35 receives and outputs to the data input/output terminal pad 31 an output from the output latch 34 and is controlled for its output of an active state or an inactive state (high impedance state) by the output control signal OPC.

Figure 4:
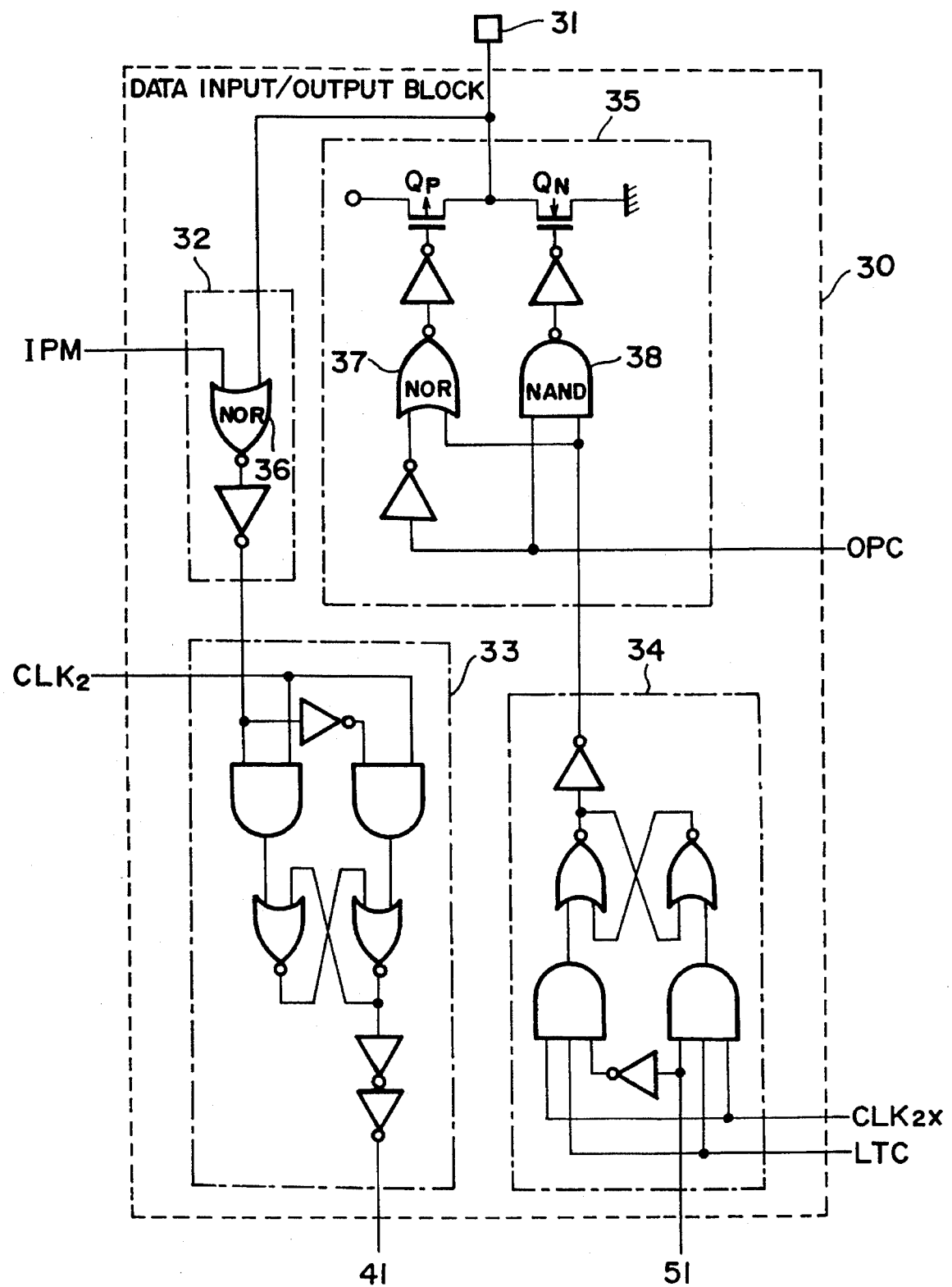
FIG. 4 is a circuit diagram showing the arrangement within a data input/output block included in the embodiment according to the present invention.

FIG. 4 shows details of the internal arrangement of the data input/output block 30 shown in FIG. 3. A 2-input NOR gate 36 within the input buffer 32 outputs a low level signal when the input mask signal IPM becomes active (high) irrespective of any values of the data signal inputted from input/output terminal pad 31 to the other input of the NOR gate 36. The input latch 33 is controlled by the second internal clock $CLK_2$ because of difficulties in preventing the data from passing through internally to the latch (synchronous with the first internal clock $CLK_1$) of the next stage since, although the set-up time and hold time against the external clock CLK are set, no such set-up time and hold time against the first intermediate clock $CLK_{1X}$ and the second intermediate clock $CLK_{2X}$ are set for receiving an external input signal. The output stage of an output three-state buffer 35 is constituted by a P-channel MOS transistor $Q_p$ and an N-channel MOS transistor $Q_N$. When the output control signal OPC is inactive (low), a 2-input NOR gate 37 outputs a low level signal and a 2-input NAND gate 38 outputs a high level signal, thereby causing both the P-channel MOS transistor $Q_p$ and the N-channel MOS transistor $Q_N$ to be turned OFF and the three-state output buffer 35 to be in an inactive state (high impedance state). When the output control signal OPC is active (high), if an output of the output latch 34 is at a high level, the NOR gate 37 outputs a low level signal and the NAND gate 38 outputs a low level signal thereby causing the P-channel MOS transistor $Q_p$ to be turned OFF but the N-channel MOS transistor $Q_N$ to be turned ON, so that a low level signal is outputted to the data input/output terminal pad 31. When the output control signal OPC is active (high), if an output of the output latch 34 is low, the NAND gate 38 outputs a low level signal and the NOR gate 37 outputs a high level signal thereby causing the P-channel MOS transistor $Q_p$ to be turned ON but the N-channel MOS transistor $Q_N$ to be turned OFF, so that a high level signal is outputted to the data input/output terminal pad 31.

Figure 5:
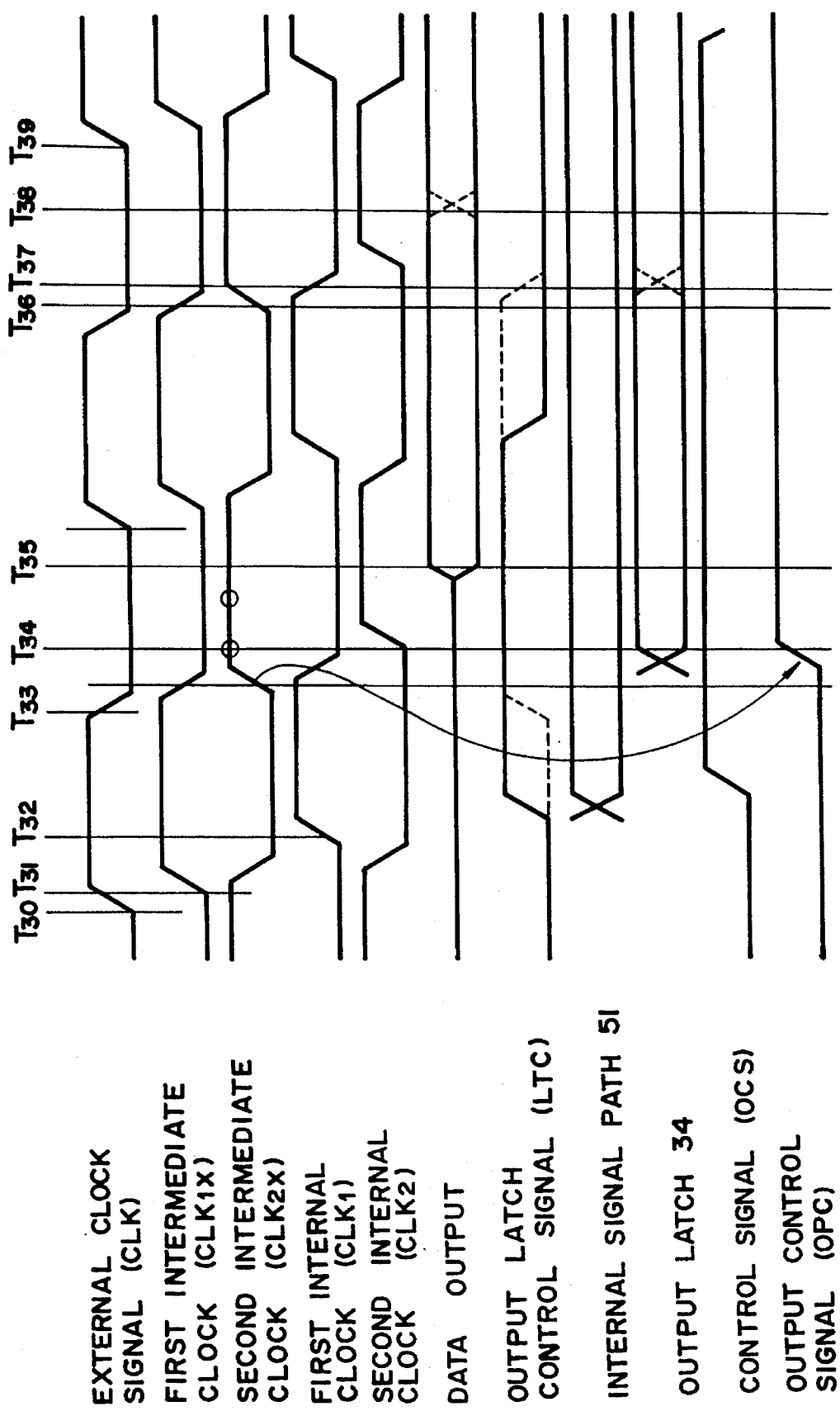
FIG. 5 is a timing chart for explaining the operation of the data input/output block included in the embodiment according to the present invention.

FIG. 5 shows a timing chart for explaining the operation of the input/output block 30 according to the invention. As shown in FIG. 5, there is a time lag of $T_{30}$–$T_{31}$ between the external clock signal CLK and the first intermediate clock $CLK_{1X}$. Also, there is a time lag of $T_{30}$–$T_{32}$ between the external clock signal CLK and the first internal clock $CLK_1$. Although these time lags, $T_{30}$–$T_{31}$ and $T_{30}$–$T_{32}$, vary depending on the values of the power supply voltage applied to the LSI chip of the microprocessor, the conditions for fabricating semiconductors, and the temperatures of surroundings, it may be, for example, that the value of the time lag $T_{30}$–$T_{31}$ is in the order of 3 nsec and that of the time lag $T_{30}$–$T_{32}$ is in the order of 8 nsec. It is assumed that the two clocks of the microprocessor from timing $T_{30}$ to the timing $T_{39}$ constitute a data output bus cycle. The timing standard values of the microprocessor are all set with the external clock signals CLK applied as standards. For example, the data output delay time is the time period between the falling (timing $T_{33}$) of the external clock signal CLK and the settling of the data (timing $T_{35}$). The data output delay time is the time period from the point when the control signal OPC becomes active (timing $T_{34}$) and the gate signal of either the PMOS transistor $Q_p$ or the NMOS transistor $Q_N$ becomes active and the point when such transistor completes the driving of the external load. According to this embodiment, the output control signal OPC is synchronized (timing $T_{34}$) with the second intermediate clock $CLK_{2X}$ in order to reduce the data output delay time and, in this way, it is possible to make the data output delay time shorter by about 5 nsec as compared with the case where the output control signal OPC is synchronized with the second internal clock $CLK_2$.

However, since the second intermediate clock $CLK_{2X}$ and the first internal clock $CLK_1$ are not in an non-overlapped relation and if, as shown by dotted lines in waveforms of the output latch control signal LTC in FIG. 5, the delay of the latch control signal LTC from the first internal clock $CLK_1$ equals to the high level period of the first internal clock $CLK_1$, the latch control signal LTC overlaps in the neighborhood of the falling thereof (timing $T_{37}$) with the rise (timing $T_{36}$) of the second intermediate clock $CLK_{2X}$. Then, there occurs a spike, in the latch signal of the output latch 34 thereby causing the contents of the output latch 34 to be rewritten and a malfunction in the data output to occur at the timing $T_{38}$ as shown by the dotted lines.

In order to avoid such a malfunction, it is necessary to suppress variations in the first internal clock $CLK_1$, the second internal clock $CLK_2$, the first intermediate clock $CLK_{1X}$ and the second intermediate clock $CLK_{2X}$, and to suppress to a sufficiently small extent the delay time from the internal clock $CLK_1$ of the control signal OCS and the latch control signal LTC and from the second internal clock $CLK_2$. These necessities have been met by the realization of special layouts on the chip in the embodiment of the invention.

Figure 6:
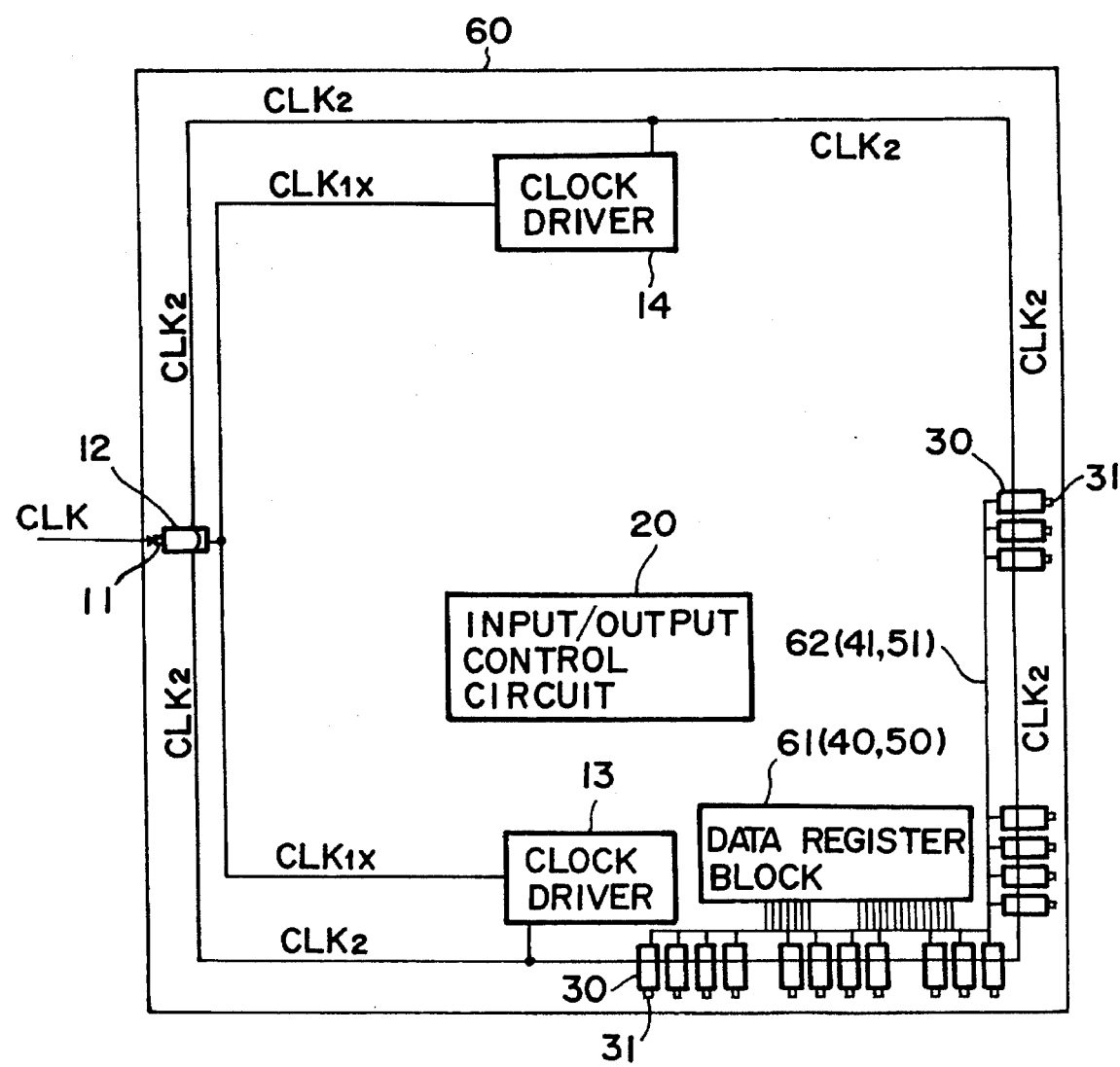
FIG. 6 is a floor plan view of the embodiment according to the present invention.

FIG. 6 shows an example of a floor plan of the layout according to the embodiment of the present invention. The numeral 60 denotes a 32 bit microprocessor chip. The numeral 30 denotes an input/output block for a corresponding data input/output terminal. There are 32 input/output blocks 30 for bit 0 to bit 31. In FIG. 6, for the sake of simplicity, the input data register 40 and the output data register 50 shown in FIG. 3 are indicated in a combined form as a data register block 61. Also, the internal signal path 41 from the input data register 40 to the input latch 33 and the internal signal path 51 from the output data register 50 to the output latch 34 shown in FIG. 3 are indicated in a combined form as an internal signal path 62.

The two clock drivers 13 and 14 are provided at an upper side and a lower side periphery (in the drawings) of the chip 60. At the middle of the left side periphery (in the drawings) of the chip 60, there are provided a clock input pad 11 and, adjacent to this clock input pad 11 to which the clock signal is applied externally, a clock input buffer 12. The arrangement according to this embodiment is able to suppress to a small extent the delay of the time when the first intermediate clock $CLK_1$ is generated after the time when the external clock signal CLK is inputted. Also, the length of the signal line of the first intermediate clock $CLK_{1X}$ from the clock input buffer 12 to the clock driver 13 equals that of the signal line of the first intermediate clock $CLK_{1X}$ from the clock input buffer 12 to the clock driver 14, so that the skew in input signals of the two clock drivers is minimized. Thus, as described above, since the two clock drivers 13 and 14 are the same with each other, it can be expected that the first internal clock $CLK_1$ and the second internal clock $CLK_2$ generated by the clock driver 13 will be in phase with the first internal clock $CLK_1$ and the second internal clock $CLK_2$ generated by the clock driver 14, respectively.

Further, as shown in FIG. 6, the second internal clocks $CLK_2$ generated by the two clock drivers 13 and 14 are outputted on the common signal line. The signal line for the second internal clock $CLK_2$ completely surrounds the chip 60 at its peripheral portion and, since the inputting is made uniformly to the 32 input/output blocks 30, it is possible to suppress to a minimum any skew of the second internal clock $CLK_2$ which is otherwise caused by differences in positions of the input/output blocks. Also, the data input/output terminals of the 32 bits of the chip 60 use the input/output blocks 30 which, including the pads, are exactly the same as one another. This decreases any skew in the second internal clock $CLK_2$ in the latch signal of the input latch 33. Also, since the input/output blocks used are all the same, it is made possible to minimize any variations in the characteristics of setup times and hold times of the input signals inputted from the data input/output terminal pads 31 against the external clock signals CLK, even among a plurality of terminals of the same kind such as the data input/output terminals.

For example, even where the output data register 50 is at a position shown in FIG. 6, the length of the wiring of the internal signal path 51 of each data input/output terminal of 32 bits on the chip 60 can vary ranging from several hundred μm to several thousand μm depending on the bits due to differences in the location of the input/output blocks. Since the differences in the delay times due to the differences in wiring as above are not negligible, the delay times dependent on the length of the wiring laid-out on the chip 60 are calculated, whereby the output buffer size of the output data register 50 is adjusted so as to suppress the delay times below predetermined values.

As explained above, according to the invention, it is possible to reduce, with respect to the external clock signal, the delay time of the data output from the data input/output terminal and it is also possible to reduce, for the multi-bit data input/output terminals which operate simultaneously, the output delay time and its variations.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A semiconductor integrated circuit comprising:

a clock input buffer which receives an external clock signal applied to an external clock input terminal pad and generates a first intermediate clock signal of the same phase as that of said external clock signal and a second intermediate clock signal of a phase opposite to that of said external clock signal;

a set of clock drivers which, with said first intermediate clock signal being applied, generate non-overlapping two internal clock signals, one being a first internal clock signal of the same phase as that of said external clock signal and the other being a second internal clock signal of a phase opposite to that of said external clock signal;

an input/output control circuit which generates at least an output control signal and a latch control signal synchronous with said first internal clock signal;

an input buffer an input node of which is connected to an input/output terminal pad and which shapes waveforms of an input signal inputted through said input/output terminal pad;

an input latch which is controlled by either one of said first internal clock signal and said second internal clock signal and latches an output of said input buffer;

an output latch which is controlled by said second intermediate clock signal and said latch control signal and latches a signal to be outputted; and a three-state buffer which is controlled by said output control signal and outputs an output of said output latch to said input/output terminal pad.

2. A semiconductor integrated circuit according to claim 1, in which:

said input buffer, said input latch, said output latch and said three-state buffer are coupled together thereby constituting a data input/output block which is positioned adjacent to a corresponding input/output terminal pad; and a plurality of said data input/output blocks having the same circuit construction are used for the input/output terminal pads wherein the same function, the same timing and the same load capacitance are regulated.

3. A semiconductor integrated circuit according to claim 1, in which:

the set of said clock drivers are in a coupled pair, disposed respectively at a first and a second peripheral side opposing each other in a chip, receive respectively said first intermediate clock signal, and produce respectively said first internal clock signal and said second internal clock signal which are not overlapped with each other;

said first internal clock signal and said second internal clock signal produced respectively by said two clock drivers use in common a signal path for said first internal clock signal and a signal path for said second internal clock signal, respectively; and a block integrally formed by said external clock input terminal pad and said clock input buffer is disposed at a third peripheral side different from said first and second peripheral sides in such a way that the lengths of wirings from said clock input buffer to said two clock drivers are the same as each other.

* * * * *